US007784569B2

(12) United States Patent
Cheng et al.

(10) Patent No.: US 7,784,569 B2

(45) Date of Patent: Aug. 31, 2010

(54) BARRIER-OVERPASSING TRANSPORTER

(75) Inventors: Pi-Ying Cheng, Hsinchu (TW); Fang-Fu Guo, Tainan (TW); Kian-Poh Wong, Johor (MY); I-Chung Lin, Taichung (TW); Yu-Hsien Lee, Chiayi (TW)

(73) Assignee: National Chiao Tung University, Hsinchu (TW)

(*) Notice: Subject to any disclaimer, the term of this patent is extended or adjusted under 35 U.S.C. 154(b) by 336 days.

(21) Appl. No.: 12/027,576

(22) Filed: Feb. 7, 2008

(65) Prior Publication Data

US 2008/0185795 A1 Aug. 7, 2008

(30) Foreign Application Priority Data

May 2, 2007 (TW) .............................. 96115620 A

(51) Int. Cl.
*B60G 23/00* (2006.01)
*B62B 9/06* (2006.01)

(52) U.S. Cl. .......................... 180/8.2; 180/41; 180/907; 280/5.26; 280/5.28

(58) Field of Classification Search ................ 280/5.26, 280/5.28, 5.2, DIG. 10; 180/209, 21, 22, 180/24.02, 24.06, 24.07, 24.08, 8.2, 8.3, 180/901, 907, 41, 167–169
See application file for complete search history.

(56) References Cited

U.S. PATENT DOCUMENTS

| | | | | |
|---|---|---|---|---|
| 3,484,829 | A | 12/1969 | Erickson | |
| 4,421,189 | A | 12/1983 | Watkins | |
| 4,473,234 | A | 9/1984 | Egen | |
| 4,566,706 | A | 1/1986 | Bihler | |
| 4,569,409 | A | 2/1986 | Kluth | |
| 4,733,740 | A * | 3/1988 | Bigowsky et al. | 180/168 |
| 4,790,548 | A * | 12/1988 | Decelles et al. | 280/5.26 |
| 4,919,489 | A | 4/1990 | Kopsco | |
| 4,962,941 | A | 10/1990 | Rembos | |
| 5,020,818 | A | 6/1991 | Oxford | |
| 5,158,309 | A | 10/1992 | Quigg | |
| 5,197,558 | A | 3/1993 | Misawa | |
| 5,263,547 | A | 11/1993 | Alber | |
| 5,273,296 | A | 12/1993 | Lepek | |
| 5,308,098 | A | 5/1994 | Shea | |
| 5,409,250 | A * | 4/1995 | Csotonyi | 280/304.1 |
| 5,423,563 | A | 6/1995 | Wild | |
| 5,577,567 | A | 11/1996 | Johnson | |
| 5,676,215 | A | 10/1997 | Misawa | |

(Continued)

FOREIGN PATENT DOCUMENTS

TW 134144 5/1990

(Continued)

*Primary Examiner*—Anne Marie M Boehler
(74) *Attorney, Agent, or Firm*—Muncy, Geissler, Olds & Lowe, PLLC

(57) ABSTRACT

The present invention discloses a barrier-overpassing transporter, which comprises: a support frame carrying a rider or another load; a sensing/adjusting module detecting a tilting state of the support frame and maintaining the support frame in a horizontal state; a ground contact module arranged below the support frame supporting an effective load and lifting the support frame to overpass a surface of a barrier; and a wireless transceiver module collecting and transmitting information to enable adjustments and activities responding to interior states of the transporter. Thereby, the present invention can provide a safe, stable, reliable, comfortable, convenient and low-cost barrier-overpassing transporter.

14 Claims, 22 Drawing Sheets

U.S. PATENT DOCUMENTS

| | | | | | |
|---|---|---|---|---|---|
| 5,701,965 | A | | 12/1997 | Kamen | |
| 5,833,248 | A | * | 11/1998 | Eguchi | 280/5.28 |
| 5,868,403 | A | | 2/1999 | Culp | |
| 5,971,091 | A | | 10/1999 | Kamen | |
| 5,975,225 | A | * | 11/1999 | Kamen et al. | 180/7.1 |
| 6,068,280 | A | * | 5/2000 | Torres | 280/304.1 |
| 6,325,167 | B1 | * | 12/2001 | Jiang | 180/9.32 |
| 6,328,120 | B1 | | 12/2001 | Haussler | |
| 6,341,784 | B1 | | 1/2002 | Carstens | |
| 6,343,664 | B2 | | 2/2002 | Morrell | |
| 6,415,879 | B2 | | 7/2002 | Kamen | |
| 6,422,576 | B1 | | 7/2002 | Michaeli | |
| 6,443,250 | B1 | | 9/2002 | Kamen | |
| 6,443,251 | B1 | | 9/2002 | Morrell | |
| 6,550,787 | B1 | | 4/2003 | Chu | |
| 6,615,938 | B2 | | 9/2003 | Morrell | |
| 6,619,414 | B2 | | 9/2003 | Rau | |
| 6,644,426 | B1 | | 11/2003 | Larue | |
| 6,799,649 | B2 | | 10/2004 | Kamen | |
| 7,422,079 | B2 | * | 9/2008 | Hsiao | 180/65.1 |
| 2001/0005073 | A1 | * | 6/2001 | Choi et al. | 280/647 |
| 2005/0104736 | A1 | * | 5/2005 | Gudat | 340/686.6 |
| 2006/0033609 | A1 | * | 2/2006 | Bridgelall | 340/10.42 |
| 2007/0056781 | A1 | * | 3/2007 | Mattes et al. | 180/65.1 |
| 2007/0267475 | A1 | * | 11/2007 | Hoglund et al. | 235/375 |

FOREIGN PATENT DOCUMENTS

| | | |
|---|---|---|
| TW | 204495 | 4/1993 |
| TW | 226782 | 7/1994 |
| TW | 301605 | 4/1997 |
| TW | 329964 | 4/1998 |
| TW | 350328 | 1/1999 |
| TW | 437388 | 5/2001 |
| TW | 472137 | 1/2002 |
| TW | 502863 | 9/2002 |
| TW | 511657 | 11/2002 |
| TW | 522137 | 3/2003 |
| TW | 567159 | 12/2003 |
| TW | M241637 | 8/2004 |
| TW | M286664 | 2/2006 |
| TW | M289015 | 3/2006 |

* cited by examiner

BARRIER-OVERPASSING TRANSPORTER

BACKGROUND OF THE INVENTION

1. Field of the Invention

The present invention relates to a barrier-overpassing transporter, particularly to an intelligent level-adjust barrier-overpassing transporter.

2. Description of the Related Art

There are everywhere stairs in the world; however, free-barrier accesses are not always sophisticated enough. Facing stairs, a common transporter can just do nothing. When uphill, the rider not only must be frightened by a tilting seat but also has to risk turning upside down. There have been researches and developments of intelligent barrier-overpassing and stair-climbing transporters or auxiliary instruments for many years. However, the prevalence is still very low. When a transporter overpasses a barrier or goes up/downstairs, the rider often tilts with the transporter. However, the conventional transporters rarely have a level-adjust function. If there is, it is usually too high in cost or not so perfect in performance because it adopts too expensive technology or uses a low-precision sensor. Briefly to speak, the poor popularization of barrier-overpassing transporters may be attributed to insufficient functions, low safety, fabrication hardness, bulky volume and high price.

A Taiwan patent No. 567159 disclosed "Mechanical Improvements to a Personal Vehicle", wherein a set of rotary wheeled arms and a complicated sensing method are used to overpass a barrier and maintain the horizontality of a support frame. Although the prior art can take the rider to overpass a barrier, a safe stair-climbing action of such a machine still needs a human assistance or an environmental aid (such as a stair rail). Besides, once the electronic system of the conventional machine malfunctions or the power supply is interrupted, the rider together with the vehicle may tilt and then fall down from a staircase.

Accordingly, the present invention proposes a barrier-overpassing transporter to effectively overcome the abovementioned problems.

SUMMARY OF THE INVENTION

The primary objective of the present invention is to provide a barrier-overpassing transporter, which integrates a ground contact module, a sensing/adjusting module and a wireless transceiver module to promote the safety, stability and convenience of a barrier-overpassing transporter.

Another objective of the present invention is to provide a barrier-overpassing transporter, which utilizes a ground contact module to decrease the torque required to advance the transporter and reduce the cost of the transporter.

Still another objective of the present invention is to provide a barrier-overpassing transporter, which utilizes a sensing/adjusting module to implement multi-directional level detection, tilt adjustment and level control.

Further another objective of the present invention is to provide a barrier-overpassing transporter, which utilizes a wireless transceiver module to implement realtime monitoring, promote motion prediction accuracy and provide instant convenience for a user.

To achieve the abovementioned objectives, the present invention proposes a barrier-overpassing transporter, which comprises: a support frame carrying a rider or another load; a sensing/adjusting module coupled to the support frame, detecting a tilting state of the support frame and maintaining the support frame in a horizontal state; a ground contact module supporting an effective load and utilizing ground contact elements to lift the support frame to overpass a surface of a barrier; and a wireless transceiver module collecting and transmitting information to enable adjustments and activities responding to interior states of the transporter and enhance safety and interactivity between the transporter and environment.

Below, the embodiments are described in detail in cooperation with the attached drawings to make easily understood the objectives, technical contents, characteristics and accomplishments of the present invention.

DETAILED DESCRIPTION OF THE INVENTION

Figure 1:
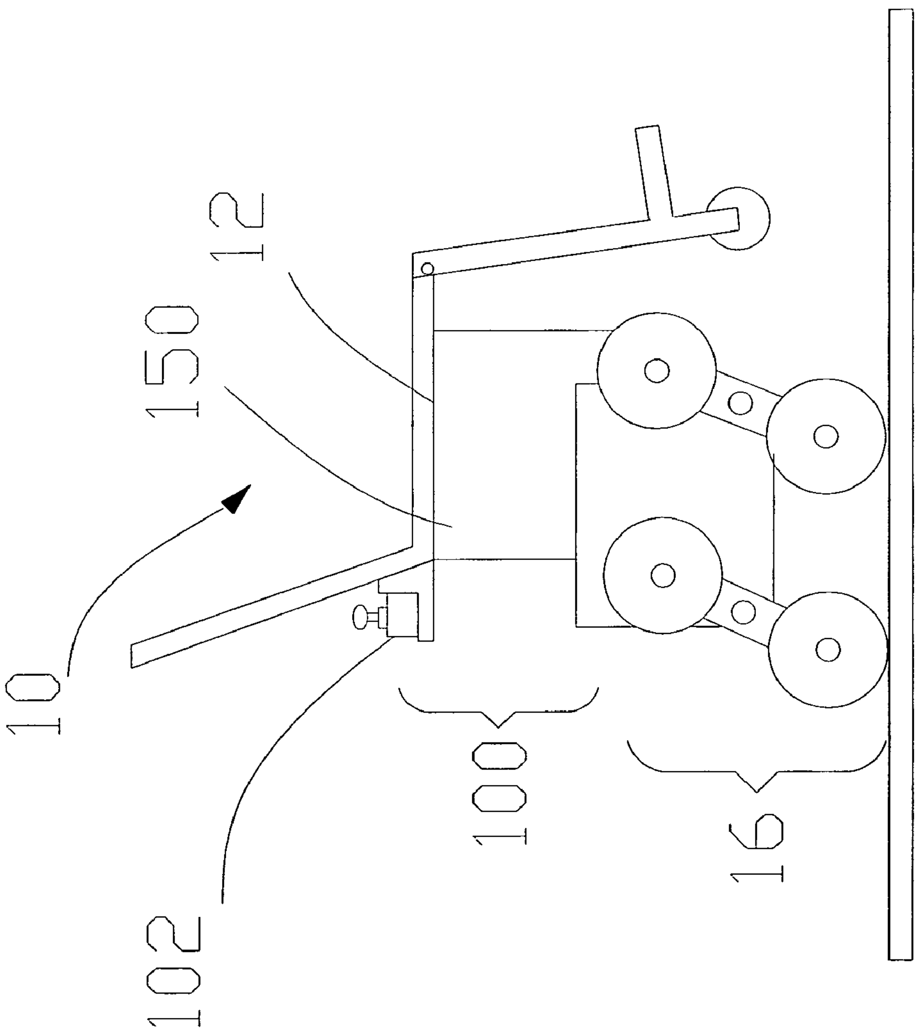
FIG. 1 is a side view of a barrier-overpassing transporter according to the present invention.

Refer to FIG. 1 a side view of a barrier-overpassing transporter according to the present invention. The barrier-overpassing transporter 10 of the present invention comprises: a support frame 12 carrying a rider or another load; a sensing/adjusting module 100 coupled to the support frame 12, detecting a tilting state of the support frame 12 and maintaining the support frame 12 in a horizontal state; and a ground contact module 16 used to transport the support frame to overpass a ground, an equivalent ground or another surface. The sensing/adjusting module 100 further comprises a multi-directional tilt-sensing device 102 used to sense a tilting state of the support frame 12 and a balance mechanism device 150 covered by a deformable protection housing and maintaining the support frame 12 in a horizontal state according to signals output by the multi-directional tilt-sensing device 102. A rider or another load is referred to as an "effective load" in the specification and the attached claims. The terminology "ground" includes any surface supporting the transporter in the specification and the attached claims. The terminology "balance mechanism device" includes any device capable of adjusting the support frame 12 and maintaining a horizontal state of the support frame 12 in the specification and the attached claims, and the device may include a deformable protection housing.

Figure 2:
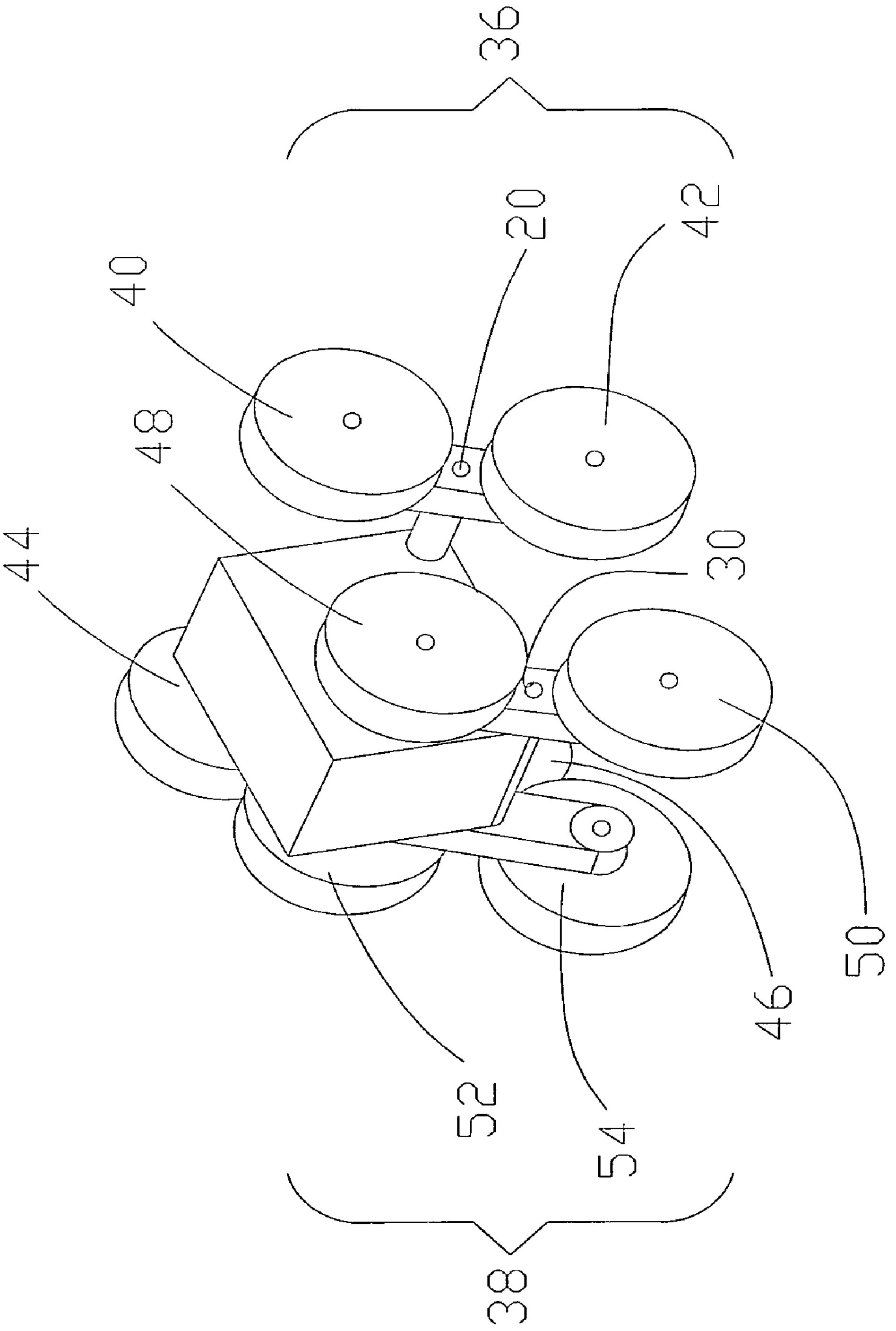
FIG. 2 is a perspective view of a barrier-overpassing transporter according to the present invention.
Figure 3:
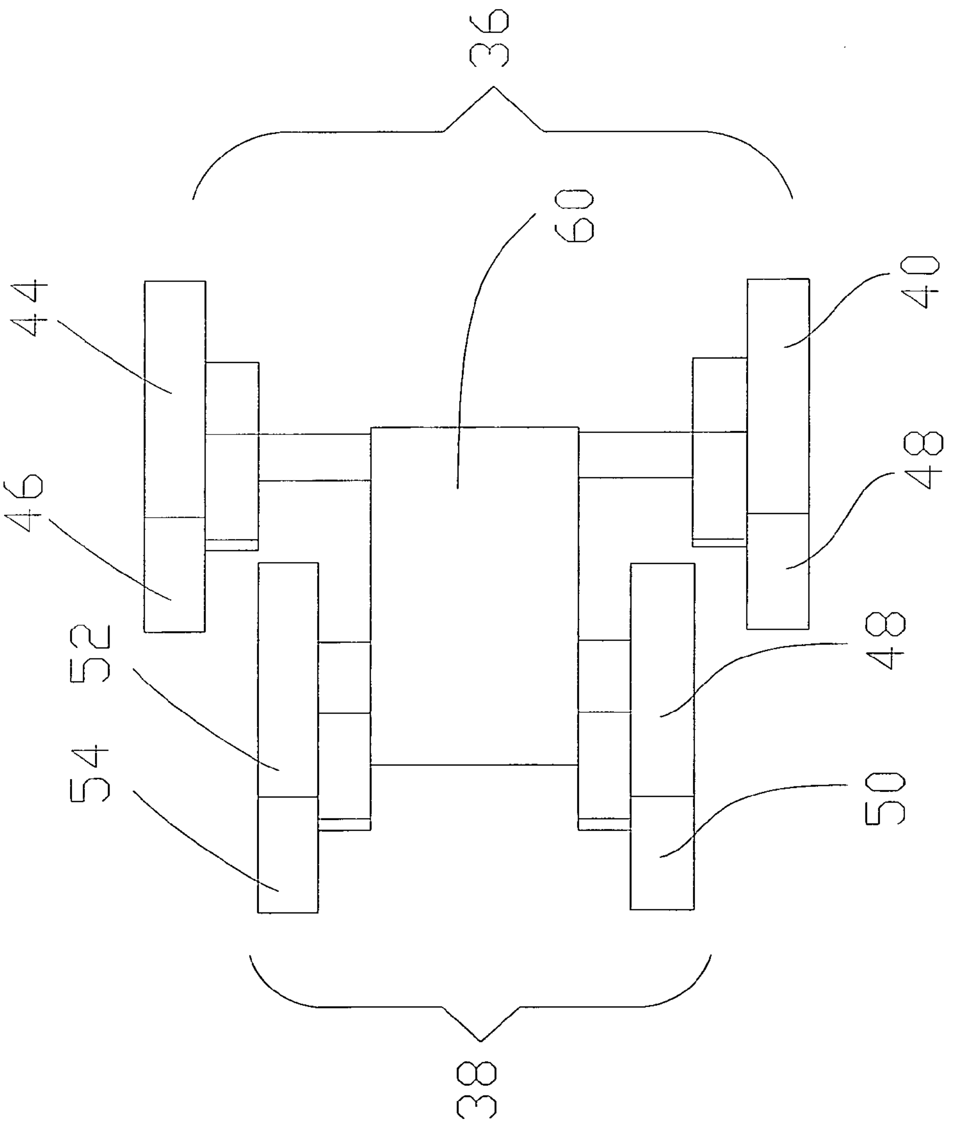
FIG. 3 is a top view of a barrier-overpassing transporter according to the present invention.
Figure 4:
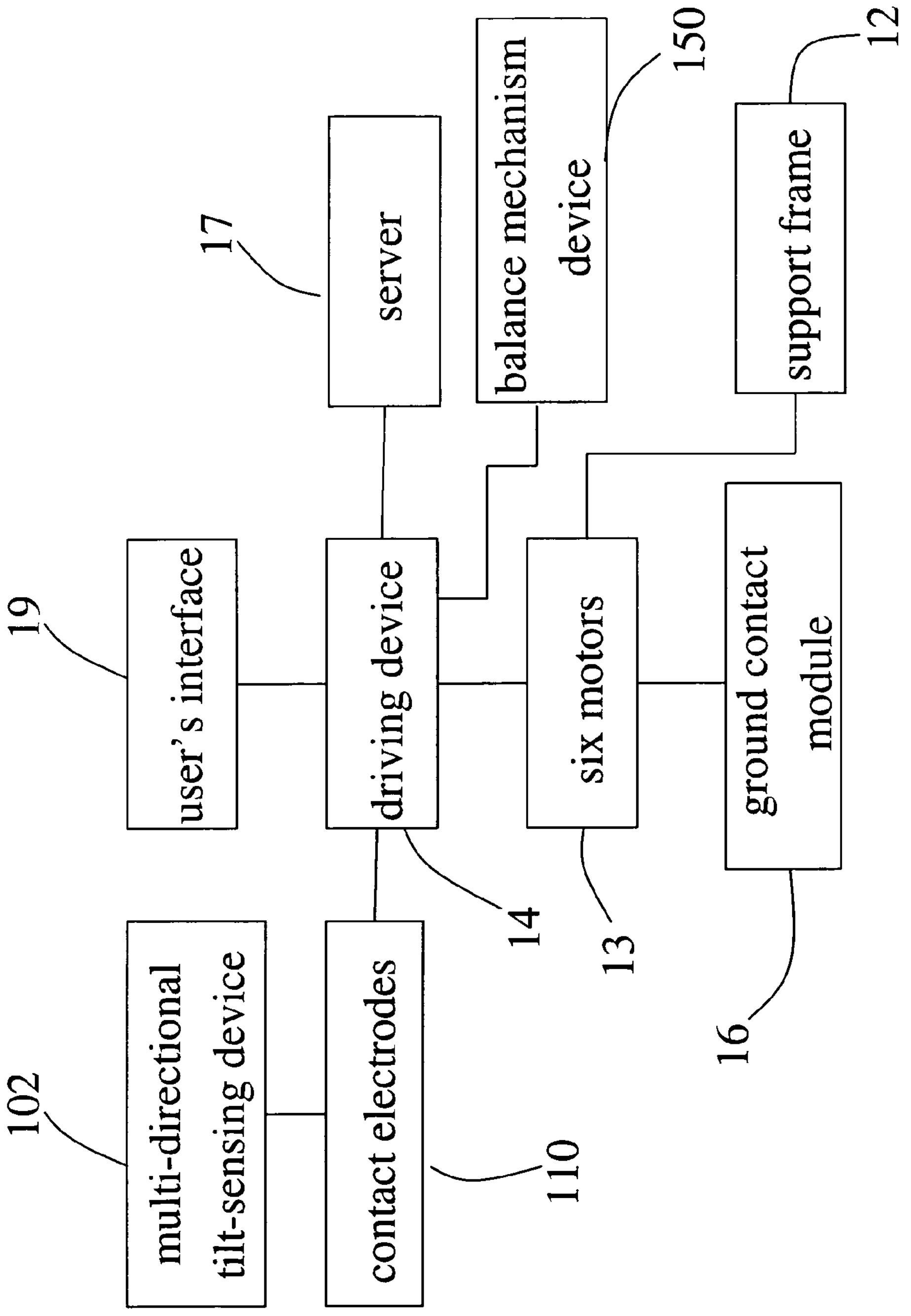
FIG. 4 is a diagram showing the flowchart of an automatic control process of a barrier-overpassing transporter according to the present invention.

Refer to FIG. 2 and FIG. 3 respectively a perspective view and a top view of a barrier-overpassing transporter according to the present invention. The operation mode described herein can apply to a transporter having at least one ground contact elements wherein each said ground contact element pivotally coupled to ends of rotation arm and driven by said rotation arm to rotate with respect to center of said rotation arm to enable said transporter to overpass a barrier. Each lateral side of the transporter has a first rotation arm 20 and a second rotation arm 30. The ground contact elements include wheels 40, 42, 44, 46, 48, 50, 52, and 54. The movement that one ground contact element is driven by rotation arm to rotate with respect to the center of rotation arm is referred to as a "cluster motion" in the specification and the attached claims. The cooperation of the motions of the ground contact elements enables the movement of the transporter. The summation of the ground contact elements includes a first cluster 36 and a second cluster 38. The first cluster 36 includes wheels 40, 42, 44 and 46, which are driven to rotate by the first rotation arms 20 with respect to the centers of the first rotation arms 20, and the second cluster 38 includes wheels 48, 50, 52 and 54, which are driven to rotate by the second rotation arms 30 with respect to the centers of the second rotation arms 30. The first cluster 36 or the second cluster 38 is referred to as a "cluster" elsewhere in the specification and the attached claims. The first rotation arm 20 or the second rotation arm 30 is referred to as a "cluster jointer" elsewhere in the specification and the attached claims. The motion that the cluster is driven to rotate by the cluster jointer can change the height of the support frame 12 with respect to the ground. The height of the support frame 12 can also be changed by other mechanism or mechanical skills. Refer to FIG. 4 a diagram showing the flowchart of an automatic control process of a barrier-overpassing transporter according to a preferred embodiment of the present invention. In the preferred embodiment, a driving device 14 controls six motors 13 and the balance mechanism device 150. The driving device 14 is controlled by a user's interface 19, the sensing device 102 or a server 17 to perform adjustments of the transporter. When the sensing device 102 detects a condition needing an adjustment, it enables the driving device 14 to operate via contact electrodes 110 coupled to the driving device 14. When the driving device 14 receives a signal for adjustment, it controls the six motors 13 to drive the ground contact module 16 and the support frame 12 to operate and controls the balance mechanism device 150 to balance the transporter.

Figure 5:
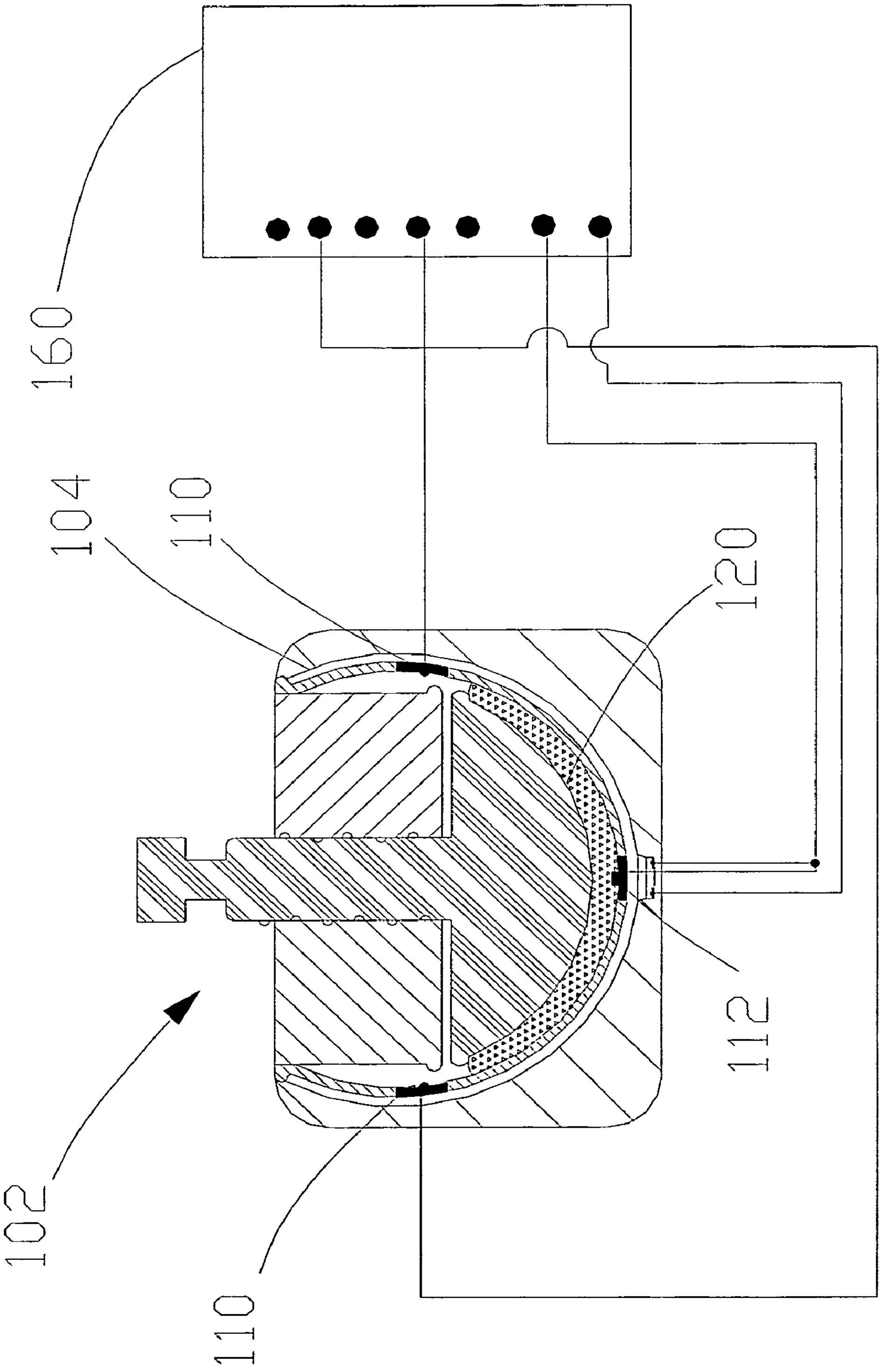
FIG. 5 is a sectional view of a multi-directional tilt-sensing device according to the present invention.

Refer to FIG. 5 a sectional view of a multi-directional tilt-sensing device 102 according to the present invention. In the multi-directional tilt-sensing device 102, a container 104 contains a liquid dielectric 120 and has at least two pairs of contact electrodes 110 thereinside. The container 104 also has a circuit connection module 160 thereinside used to separate the positive and negative electrodes of the contact electrodes 110 and a bottom electrode 112 to prevent the electrodes from short circuit lest the circuit be damaged. When the support frame 12 is tilted, the liquid dielectric 120 still maintains horizontal and triggers the conduction state of the contact electrode 110 in the tilting direction. Then, the balance mechanism changes the tilt angle of the support frame 12 and restores the support frame 12 back to a horizontal state.

Figure 6A:
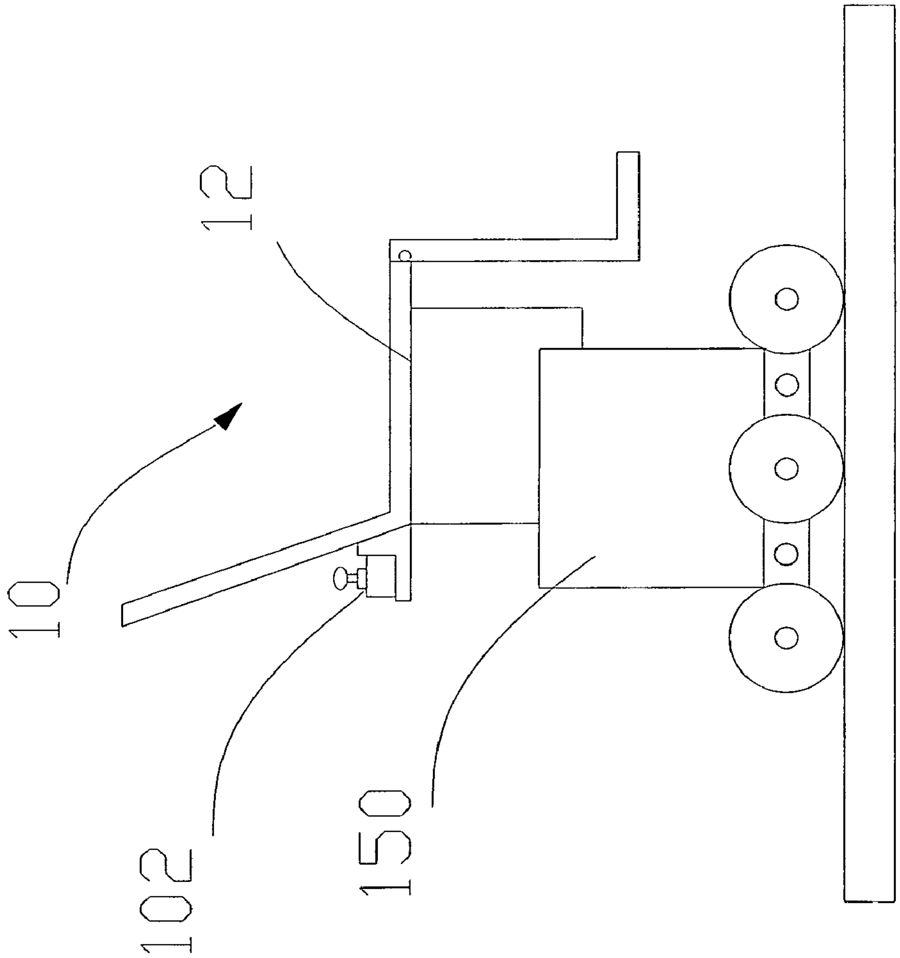
FIG. 6A is a diagram schematically showing a barrier-overpassing transporter and a balance mechanism device on a horizontal ground according to the present invention.
Figure 6B:
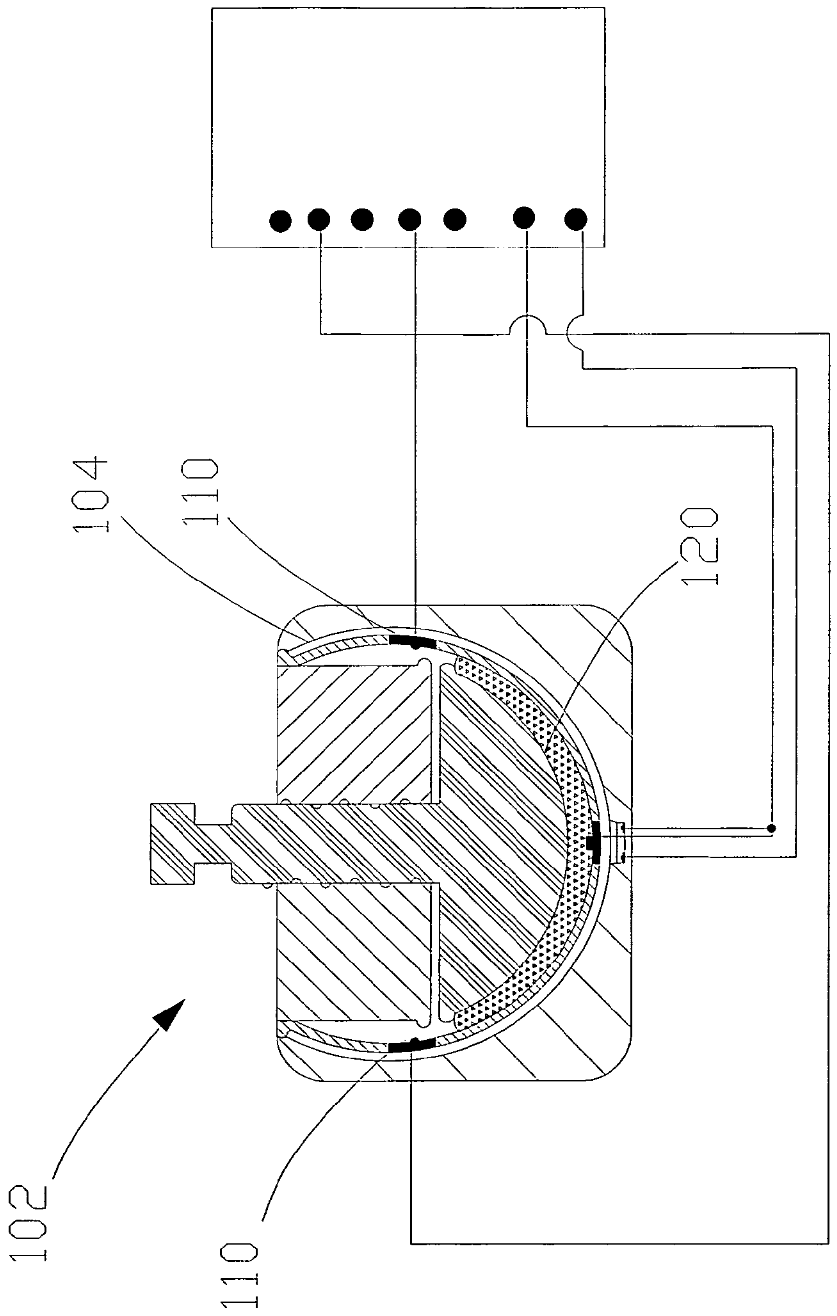
FIG. 6B is a sectional view of a sensing device according to the present invention when a barrier-overpassing transporter on a horizontal ground.
Figure 7A:
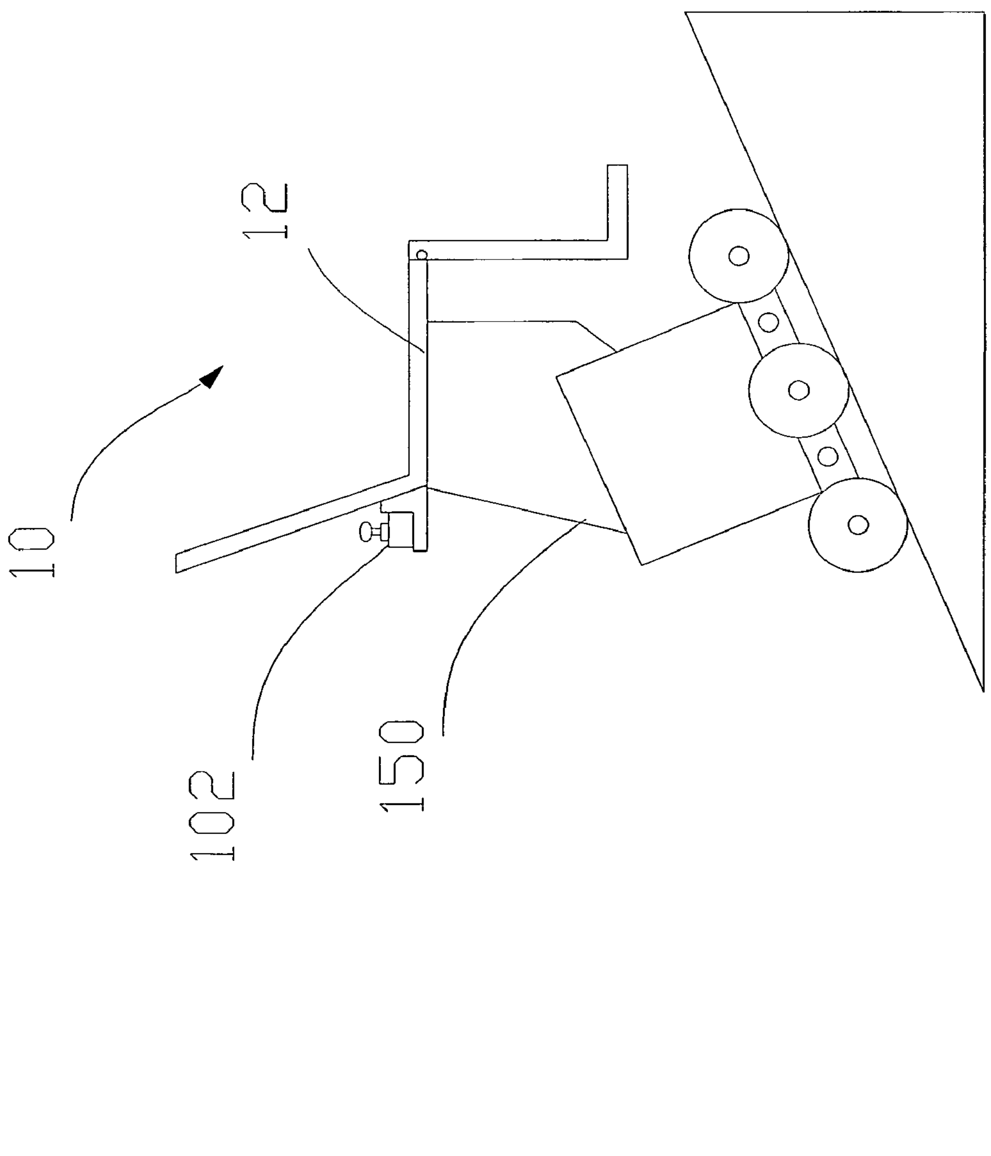
FIG. 7A is a diagram schematically showing that a support frame has been adjusted by a balance mechanism device according to the present invention when a barrier-overpassing transporter on a forward-tilting ground.
Figure 7B:
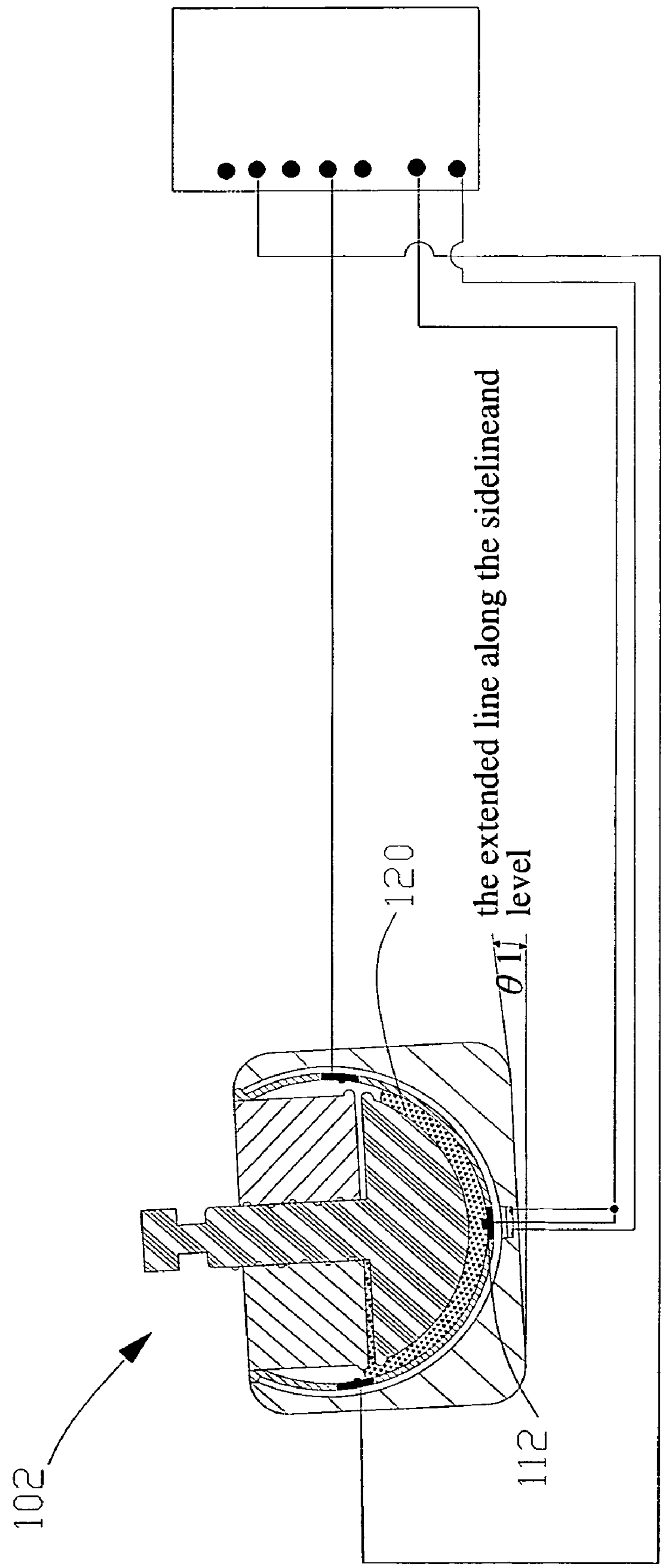
FIG. 7B is a sectional view of a sensing device according to the present invention when a barrier-overpassing transporter on a forward-tilting ground.
Figure 8A:
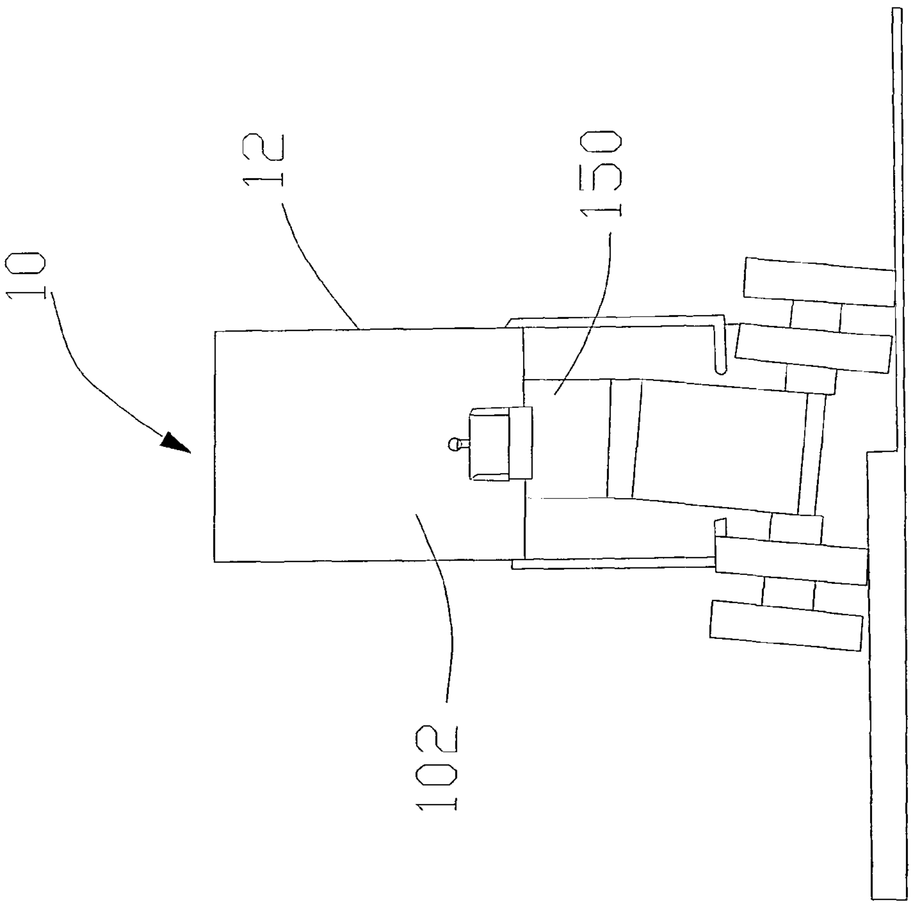
FIG. 8A is a diagram schematically showing that a support frame has been adjusted by a balance mechanism device according to the present invention when a barrier-overpassing transporter on a side-tilting ground.
Figure 8B:
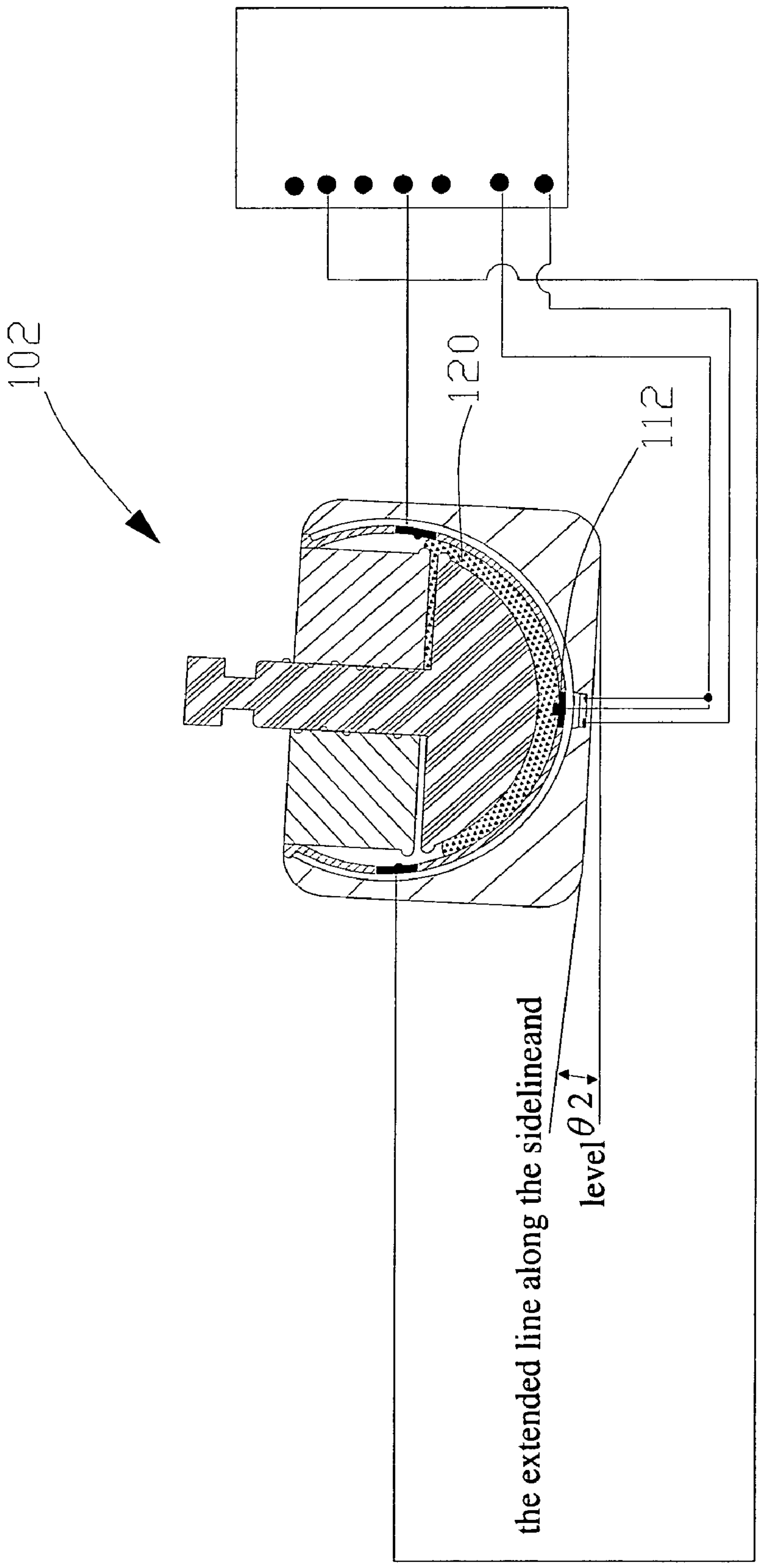
FIG. 8B is a sectional view of a sensing device according to the present invention when a barrier-overpassing transporter on a side-tilting ground.

Refer to FIG. 6A to FIG. 8B. FIG. 6A is a diagram schematically showing a barrier-overpassing transporter and a balance mechanism device on a flat ground according to the present invention. FIG. 6B is a sectional view of a sensing device according to the present invention when a barrier-overpassing transporter on a flat ground. FIG. 7A is a diagram schematically showing that a support frame has been adjusted by a balance mechanism device according to the present invention when a barrier-overpassing transporter on a forward-tilting ground. FIG. 7B is a sectional view of a sensing device according to the present invention when a barrier-overpassing transporter on a forward-tilting ground. FIG. 8A is a diagram schematically showing that a support frame has been adjusted by a balance mechanism device according to the present invention when a barrier-overpassing transporter on a side-tilting ground. FIG. 8B is a sectional view of a sensing device according to the present invention when a barrier-overpassing transporter on a side-tilting ground. When the barrier-overpassing transporter is in a horizontal state, the height differences between the liquid dielectric 120 and the contact electrodes 110 are equal, and the liquid dielectric 120 does not contact the contact electrodes 110. When the barrier-overpassing transporter is on a forward-tilting or side-tilting ground, a part of contact electrodes 110 contact the liquid dielectric 120. Thus, the liquid dielectric 120 enables the conduction state between the contact electrode 110 and the bottom electrode 112 at the bottom of the hemispherical container 120. When the barrier-overpassing transporter is on a forward-tilting ground, the level plane of the liquid dielectric 120 and the extension line of the bottom contain an angle $\theta_1$. When the barrier-overpassing transporter is on a side-tilting ground, the level plane of the liquid dielectric 120 and the extension line of the bottom contain an angel $\theta_2$. Thereby, the sensing device 102 can detect the tilt of the support frame 12 and feedback signals to the balance mechanism device 150. Then, the balance mechanism device 150 adjusts the support frame 12 to a horizontal state.

Figure 9:
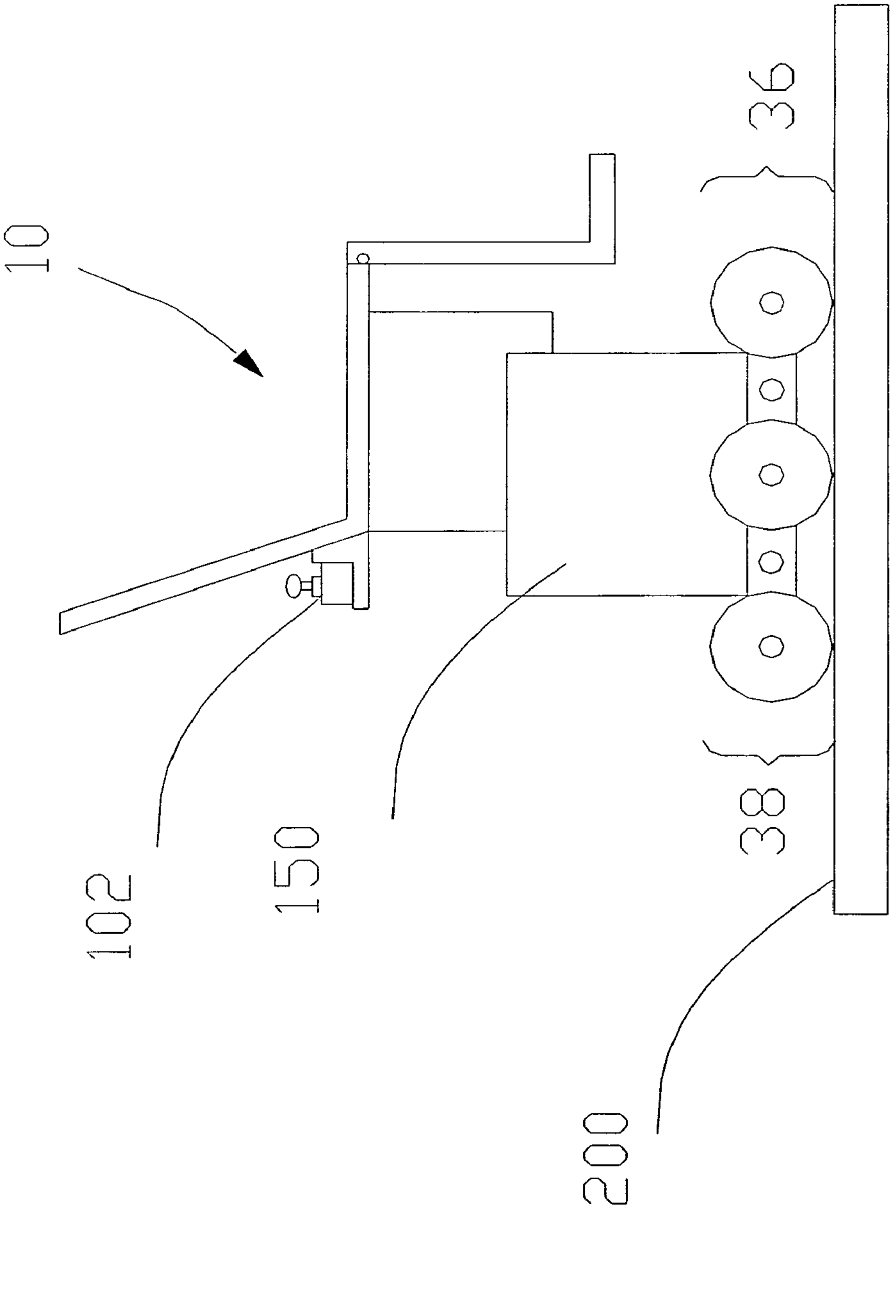
FIG. 9 is a side view schematically showing that a barrier-overpassing transporter moves on a flat ground according to the present invention.
Figure 10:
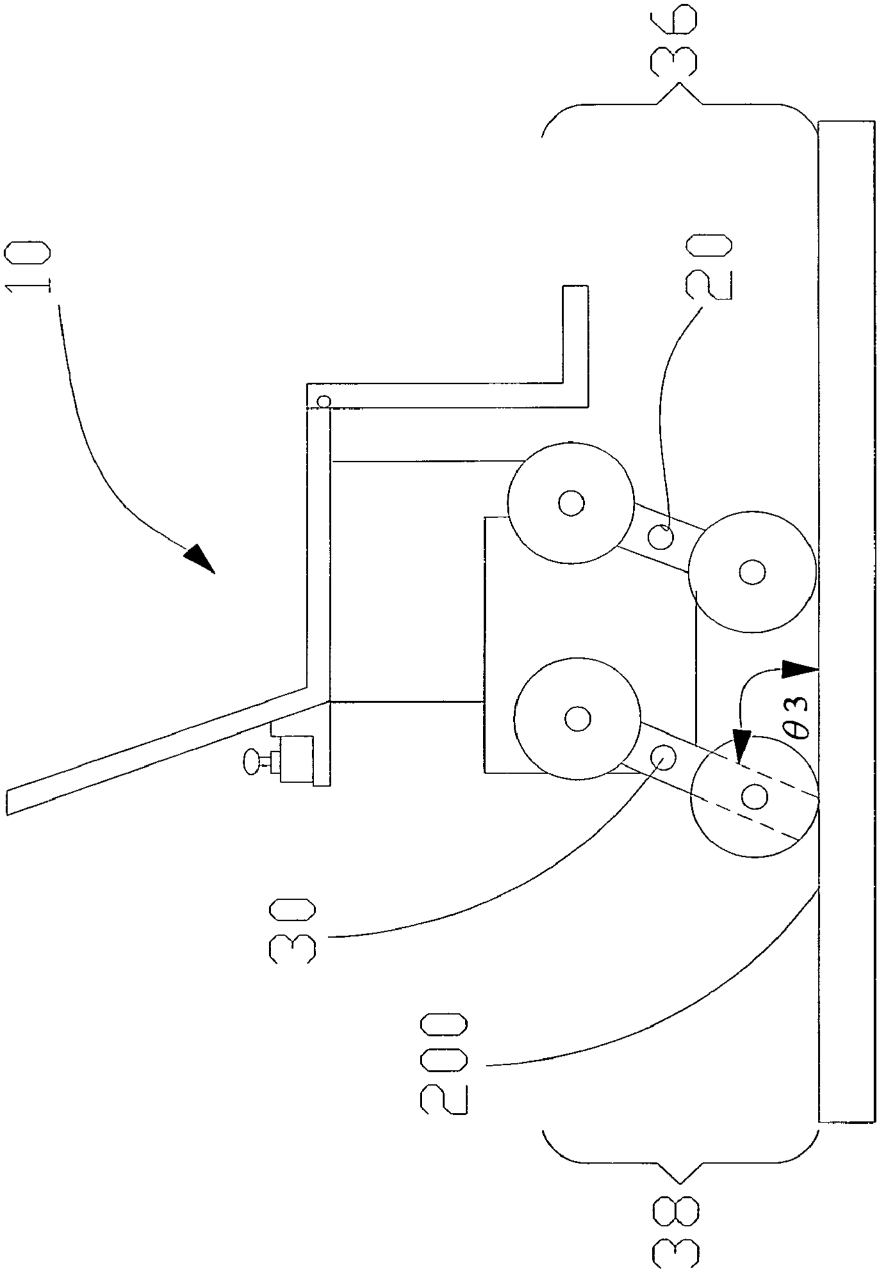
FIG. 10 is a side view schematically showing that the flat ground and the rotation arm contain a non-zero angle when a barrier-overpassing transporter moves on a flat ground according to the present invention.
Figure 11:
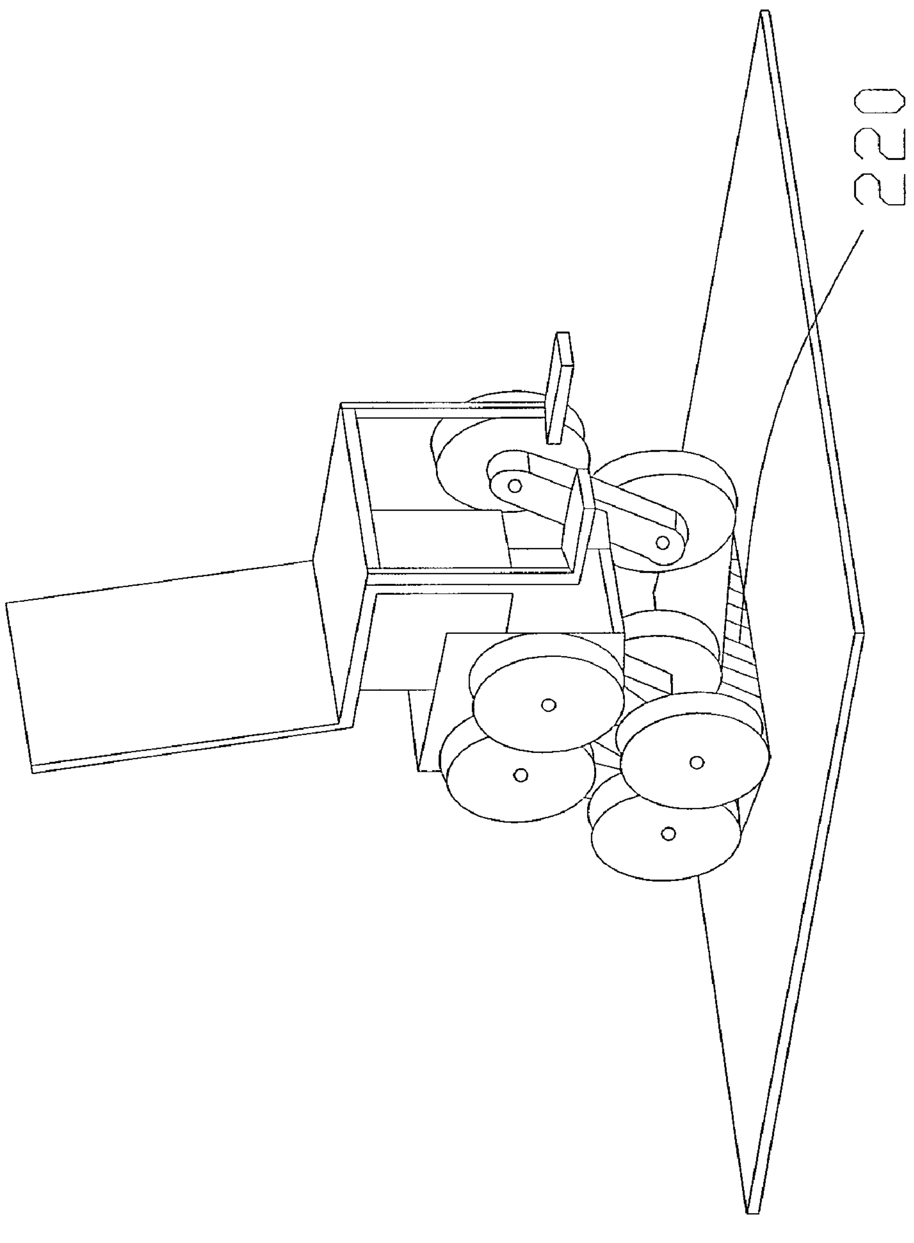
FIG. 11 is a perspective view schematically showing that the contact points between the ground contact elements and the flat ground form a plane when a barrier-overpassing transporter moves on a flat ground according to the present invention.

Refer to FIG. 9 a diagram schematically showing that a barrier-overpassing transporter moves on a flat ground according to the present invention. When the barrier-overpassing transporter 10 moves on a flat ground 200, the first rotation arms 20 of the first cluster 36 and the second rotation arms 30 of the second cluster 38 are parallel to the flat ground 200, and all the ground contact elements contact the ground. Refer to FIG. 10 and FIG. 11. When the barrier-overpassing transporter 10 moves on a flat ground 200, the flat ground 200 and the first rotation arm 20 of the first cluster 36/the second rotation arm 30 of the second cluster 38 may contain a non-zero angle $\theta_3$. Then, a part of ground contact elements contact the flat ground 200, and the contact points form a plane 220. Via the plane 220, the transporter can move stably on the flat ground 200.

Figure 12:
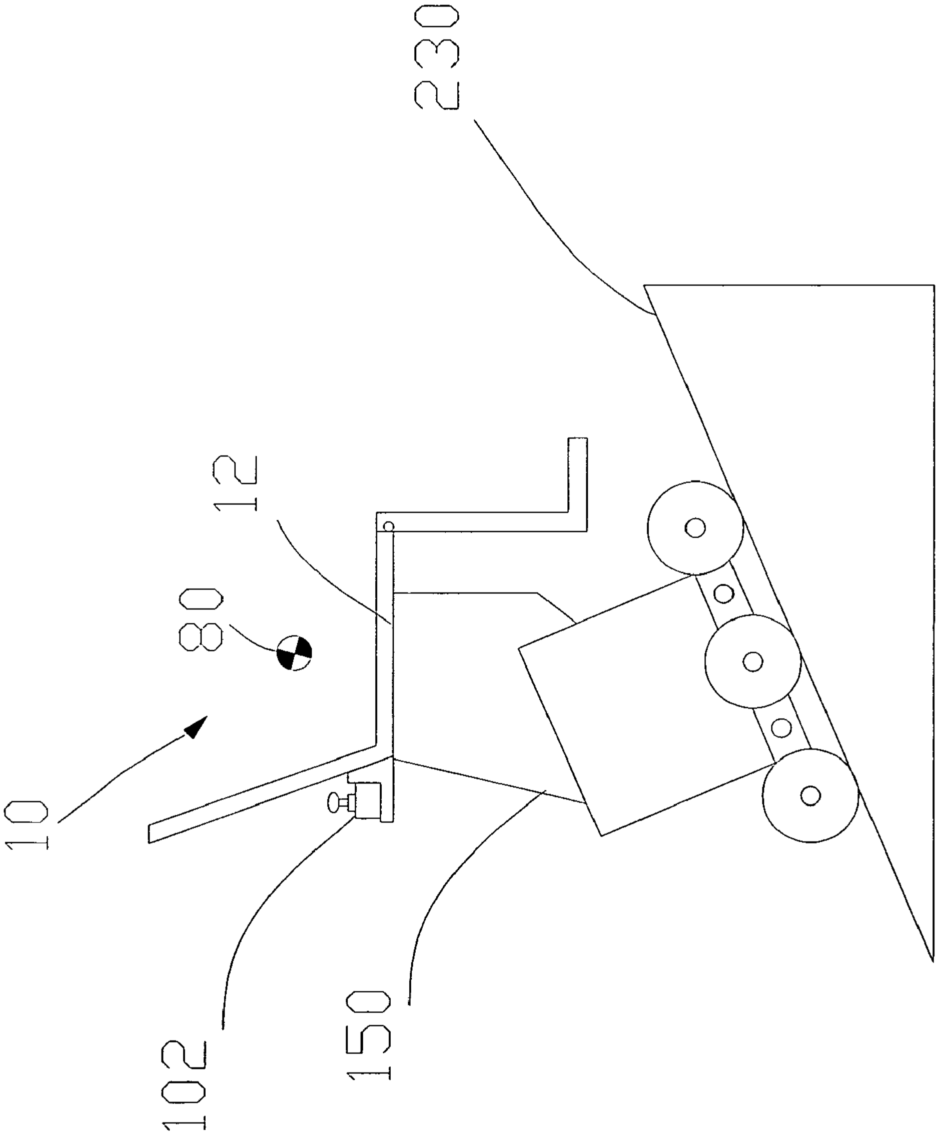
FIG. 12 is a diagram schematically showing that the body's gravity center is moved forward when a barrier-overpassing transporter moves uphill according to the present invention.
Figure 13:
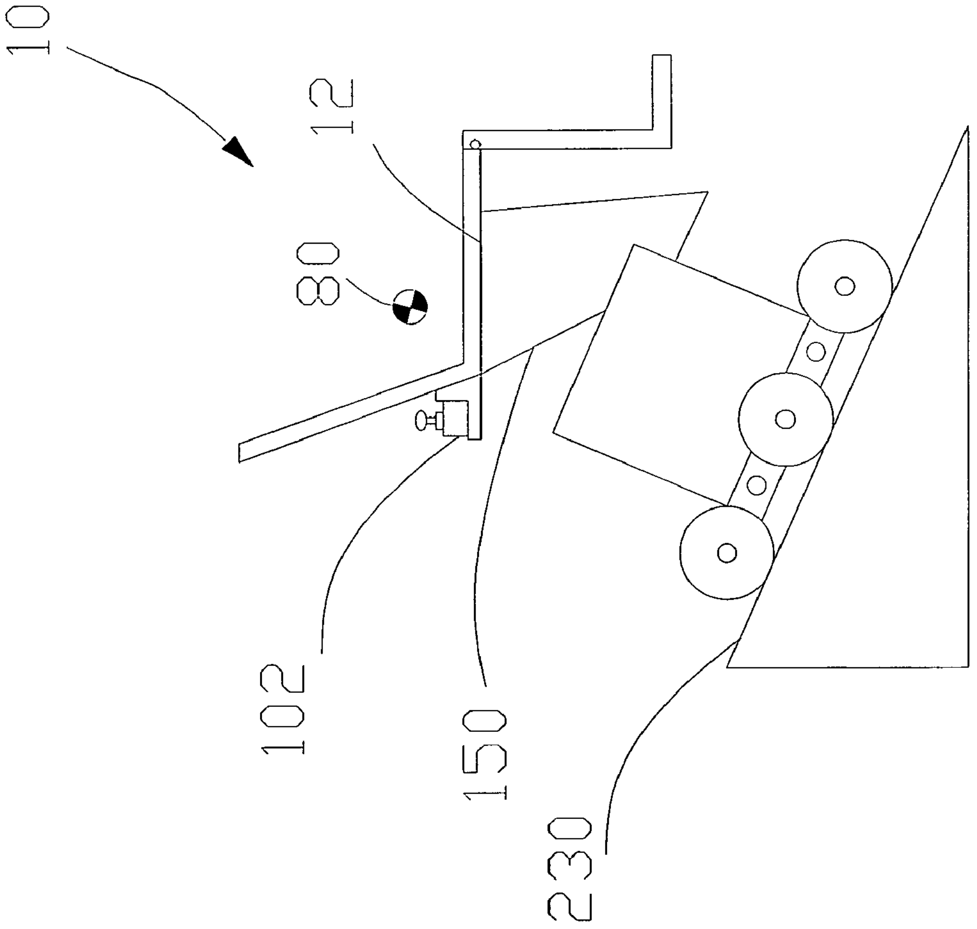
FIG. 13 is a diagram schematically showing that the body's gravity center is moved backward when a barrier-overpassing transporter moves downhill according to the present invention.
Figure 14:
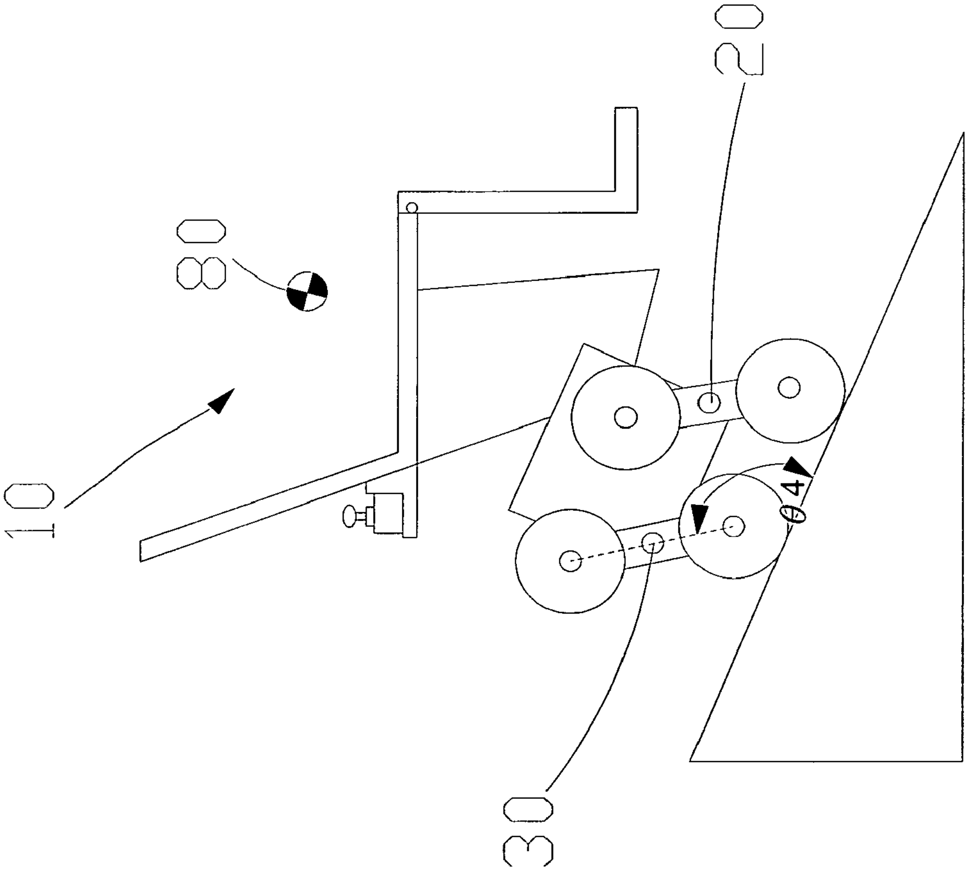
FIG. 14 is side view schematically showing that the flat ground and the rotation arm contain a non-zero angle when a barrier-overpassing transporter moves downhill according to the present invention.
Figure 15:
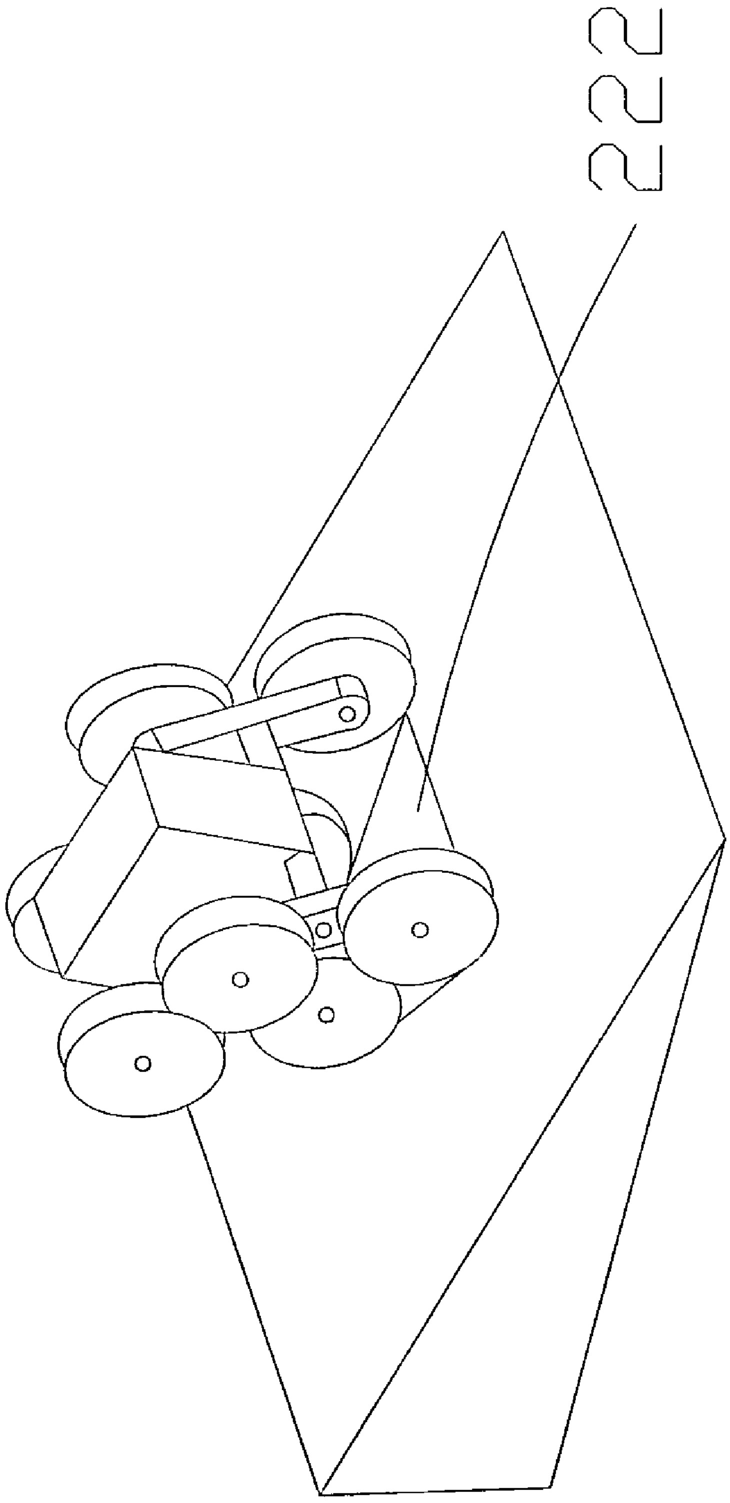
FIG. 15 is a perspective view schematically showing that the contact points between the ground contact elements and the downhill ground form a plane when a barrier-overpassing transporter moves downhill according to the present invention.

Refer to FIG. 12 and FIG. 13 diagrams respectively schematically showing that a barrier-overpassing transporter moves uphill or downhill according to the present invention. When the barrier-overpassing transporter moves on a tilting ground 230, e.g., moves uphill, the support frame 12 can be maintained in a horizontal state via the multi-directional tilt-sensing device 102 and the balance mechanism device 150, and the body's gravity center 80 moves toward the advance direction with respect to the transporter (moving forward). When the transporter moves downhill, the body's gravity center 80 moves opposite to the advance direction with respect to the transporter. Refer to FIG. 14 and FIG. 15. When the barrier-overpassing transporter 10 moves on the tilting ground 230, the tilting ground 230 and the first rotation arm 20 of the first cluster 36/the second rotation arm 30 of the second cluster 38 may contain a non-zero angle $\theta_4$. No matter what degree the angle has, the contact points between the tilting ground and the ground contact elements can form a plane 222. Via the plane 222, the transporter can move stably on the tilting ground 230.

Figure 16:
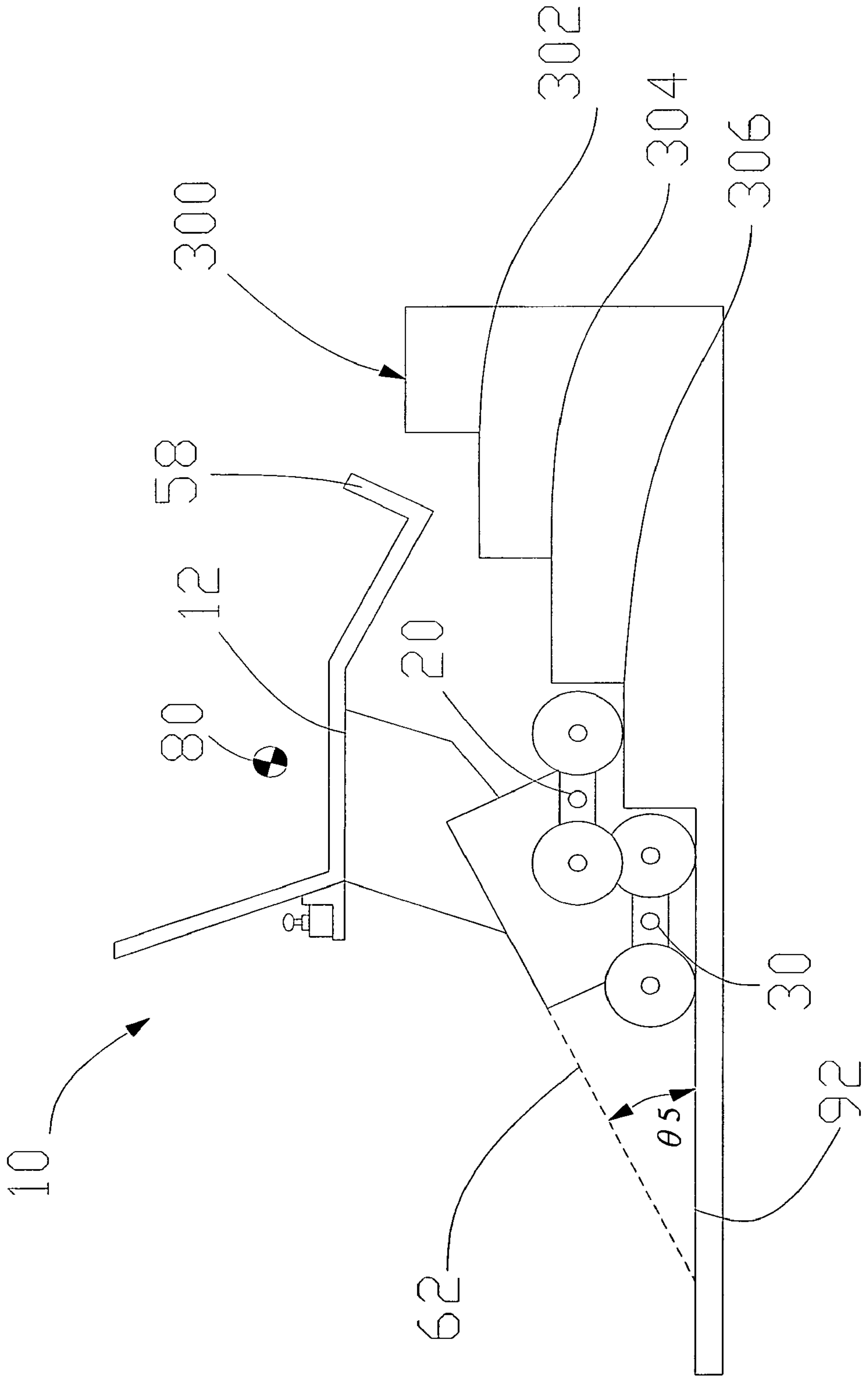
FIG. 16 is a side view schematically showing that a barrier-overpassing transporter is moving upstairs according to the present invention.
Figure 17:
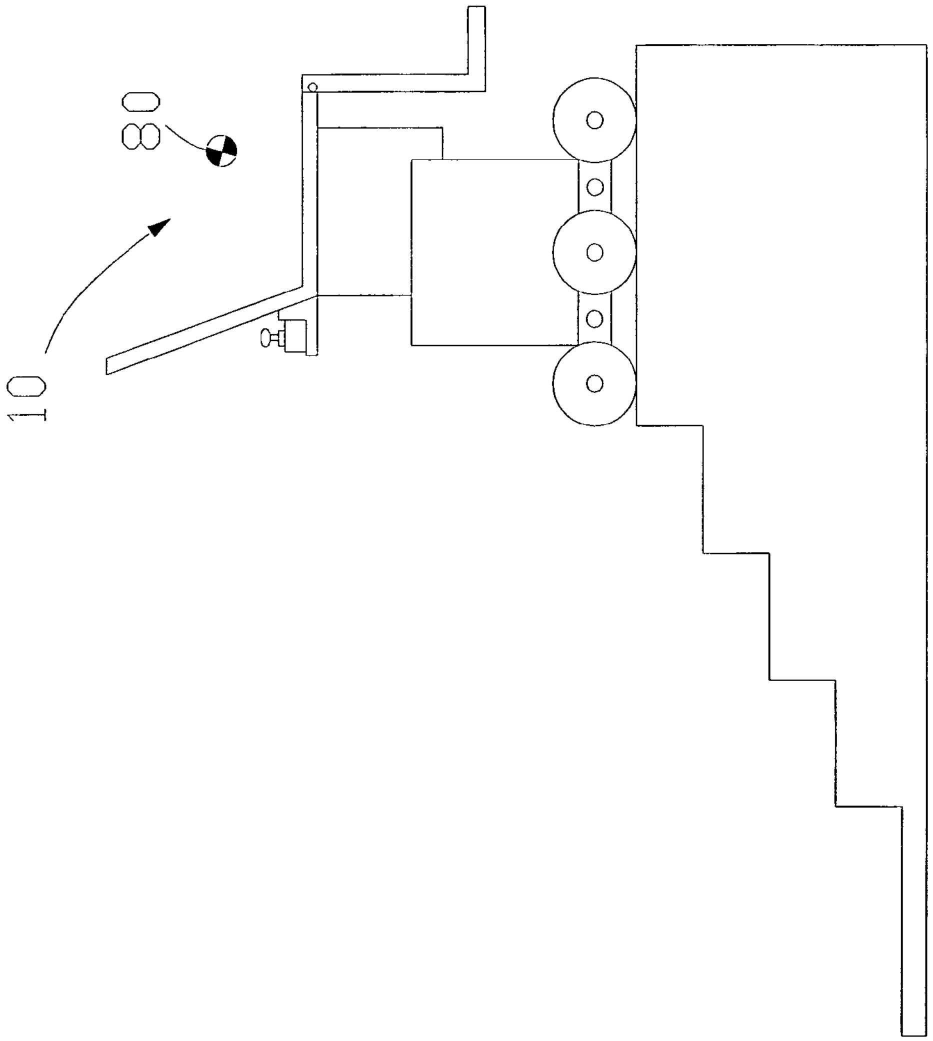
FIG. 17 is a side view schematically showing that a barrier-overpassing transporter has been upstairs according to the present invention.

Refer to FIG. 16 and FIG. 17 diagrams respectively schematically showing that a barrier-overpassing transporter is moving upstairs and has been upstairs according to the present invention. When the barrier-overpassing transporter 10 meets a barrier 300 and intends to overpass the barrier 300, the pedal 58 will be adjusted to an appropriate angle to facilitate overpassing the barrier 300. The first and second clusters synchronously rotate until the ground contact elements of the first cluster contact the third stairstep 302 of a staircase. Firstly, the barrier-overpassing transporter 10 begins to tilt; at the same time, the support frame 12 can be maintained at a horizontal state and moved forward via the multi-directional tilt-sensing device and the balance mechanism device, and the body's gravity center 80 is thus also moved forward. The first and second clusters keep on synchronously rotating, and the tilting degree is maintained fixed until the first and second rotation arms 20 and 30 resumes horizontality. While the transporter is going to finish climbing one stairstep, the tilting degree changes again. Before the tilting degree changes, the barrier-overpassing transporter 10 can climb the stair stably. When the tilting degree increases, the multi-directional tilt-sensing device and the balance mechanism device can maintain the support frame 12 at a horizontal state and move the support frame 12 forward, and the body's gravity center 80 can thus be moved forward also. The tilting degree of the barrier-overpassing transporter 10 in the specification and the attached claims is defined by an angle $\theta_5$ contained by the long axis 62 of the transporter base and the horizontal surface 92. When the ground contact elements of the first cluster contact the first stairstep 306 of the staircase, the ground contact elements of the second cluster contact the second stairstep 304, and the first rotation arms 20 and the second rotation arms 30 are vertical to the horizontal plane. Then, the tilting degree decreases; via the multi-directional tilt-sensing device and the balance mechanism device, the support frame 12 is maintained at a horizontal state and moved backward, and the body's gravity center 80 is thus also moved backward. Finally, all the ground contact elements of the first cluster and a part of the ground contact elements of the second cluster contact the first stairstep 306, and the first rotation arms 20 and the second rotation arms 30 are parallel to the horizontal plane. At this time, the barrier-overpassing transporter 10 resumes horizontality; via the multi-directional tilt-sensing device and the balance mechanism device, the support frame 12 also resumes horizontality as if it had not gone upstairs, and the pedal 58 is also adjusted to an appropriate angle. Thus, the stair-climbing activity is completed. As the support frame 12 is capable of rotation, the barrier-overpassing transporter 10 may also undertake stair climbing after the support frame 12 has 180 degrees rotated.

Figure 18:
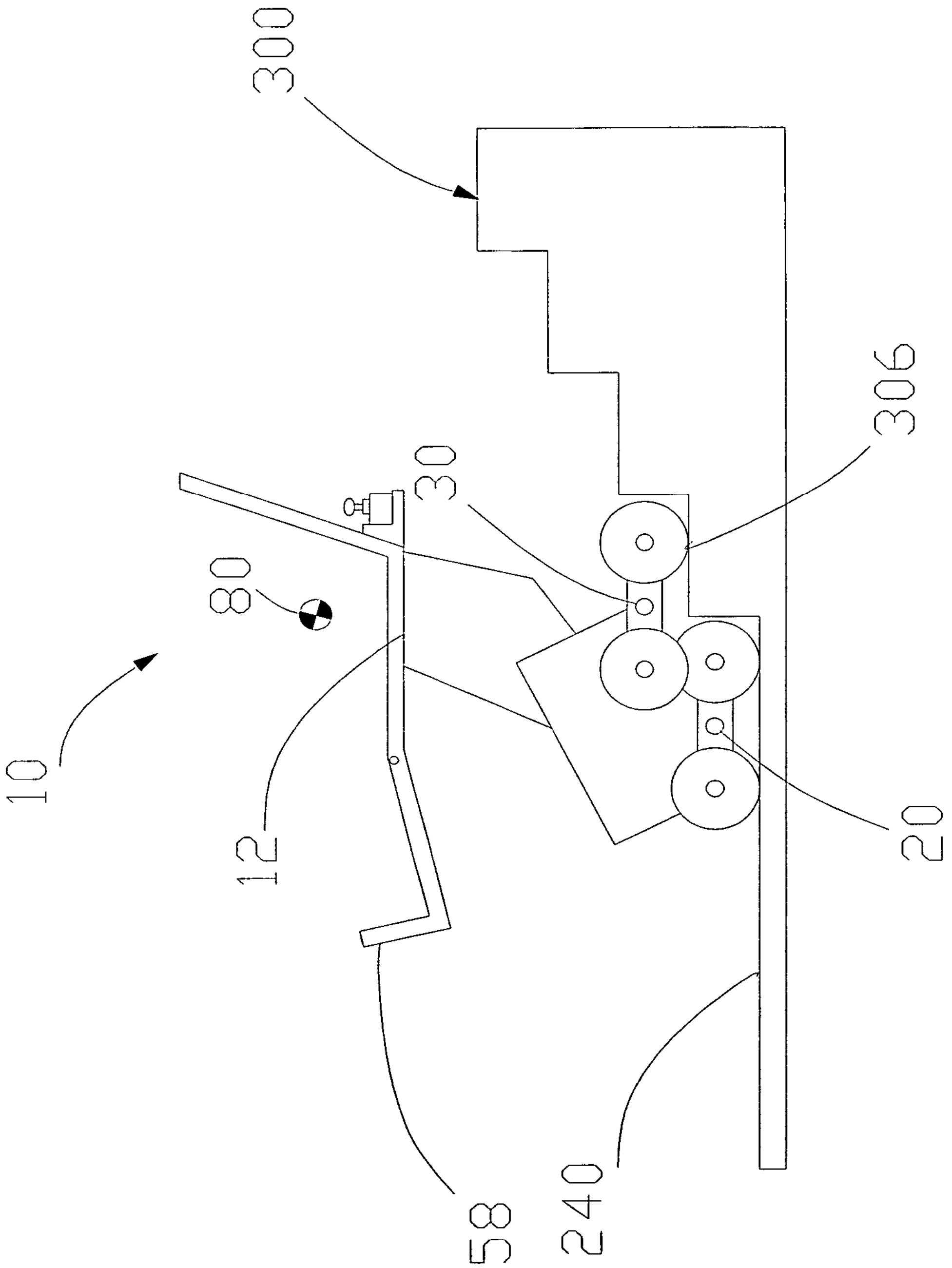
FIG. 18 is a side view schematically showing that a barrier-overpassing transporter is moving downstairs according to the present invention.

Refer to FIG. 18 a diagram schematically showing that a barrier-overpassing transporter is moving downstairs according to the present invention. When the barrier-overpassing transporter 10 meets a barrier 300 and intends to overpass the barrier 300, the pedal 58 will be adjusted to an appropriate angle to facilitate overpassing the barrier 300. At beginning, the barrier-overpassing transporter 10 advances continuously, the first rotation arms 20 and the second rotation arms 30 are parallel to the horizontal plane. Once the ground contact elements of the first cluster do not contact a ground but hangs in the air, the barrier-overpassing transporter 10 begins to tilt. At this time, the support frame 12 can be maintained at a horizontal state and moved backward via the multi-directional tilt-sensing device and the balance mechanism device, and the body's gravity center 80 is thus also moved backward. The tilting degree is maintained fixed until the transporter is going to finish stair descending. Before the tilting degree changes, the barrier-overpassing transporter 10 can move downstairs stably. At this time, the first and second clusters keep on synchronously rotating to stably descend stairs. Via the multi-directional tilt-sensing device and the balance mechanism device, the support frame 12 can be maintained at a horizontal state and moved backward, and the body's gravity center 80 is thus also moved backward. The first and second clusters keep on synchronously rotating, and the tilting degree is maintained fixed; thus, the barrier-overpassing transporter 10 can descend the staircase stably. The first and second clusters keep on synchronously rotating until the ground contact elements of the first cluster 36 contact a ground 240 and the ground contact elements of the second cluster 38 contact the first stairstep 306. At this time, the first and second rotation arms 20 and 30 resumes horizontality. Then, the tilting degree decreases, and the multi-directional tilt-sensing device and the balance mechanism device maintains the support frame 12 at a horizontal state and moves the support frame 12 forward, and the body's gravity center 80 can thus be moved forward. Then, a part of ground contact elements of the first and second clusters contact the ground 240, and the first and second clusters keep on synchronously rotating; the multi-directional tilt-sensing device and the balance mechanism device maintains the support frame 12 at a horizontal state and moves the support frame 12 forward, and the body's gravity center 80 is moved forward. Finally, the pedal 58 is adjusted to an appropriate angle. Thus, the stair-descending activity is completed. As the support frame 12 is capable of rotation, the barrier-overpassing transporter 10 may also undertake stair descending after the support frame 12 has 180 degrees rotated.

Refer to from FIG. 16 to FIG. 18 for further functions of the barrier-overpassing transporter according to the present invention. In addition to rotating synchronously, the first and second clusters can also operate in another mode via the control of a rider or another control means to make the motion smoother when the barrier-overpassing transporter 10 is going to move up/downstairs. The barrier-overpassing transporter 10 is apt to be unstable while it is going to finish stair climbing or while it just begins to descend a staircase. At this time, non-synchronous rotation of the first and second clusters can make stair climbing/descending more stably. The non-synchronous rotation can be manually operated by a rider (via a user's interface) or automatically operated by a control system. Via the multi-directional tilt-sensing device and a wireless transceiver module, the driving device can adjust and operate the transporter. When receiving signals, the driving device controls the balance mechanism device to perform adjustment and controls six motors to operate the first and second clusters to move the transporter up/downstairs stably.

Figure 19:
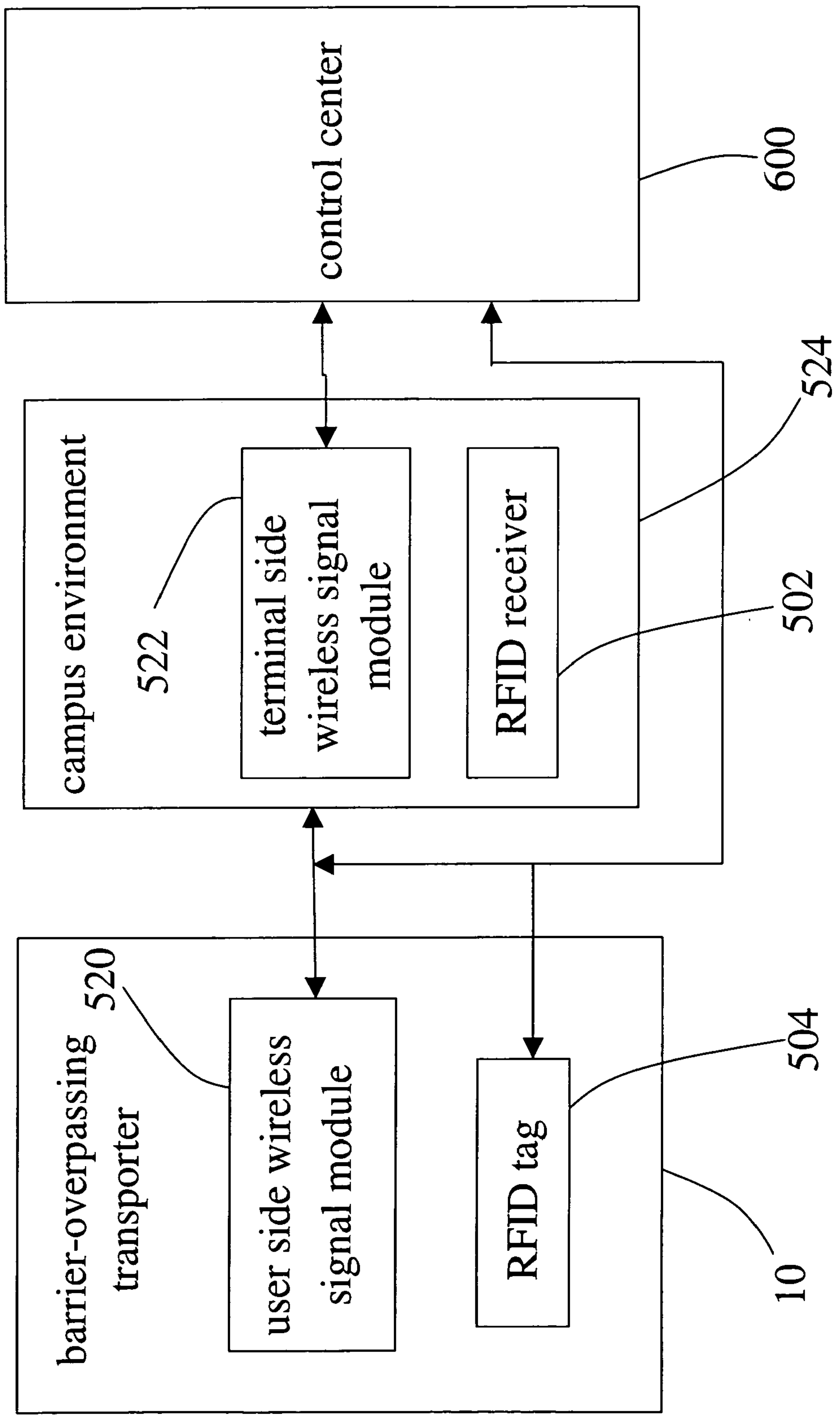
FIG. 19 is a flowchart for the cooperation of a barrier-overpassing transporter and a wireless transceiver module according to the present invention.

Refer to FIG. 19 a flowchart for the cooperation of a barrier-overpassing transporter and a wireless transceiver module according to the present invention. The wireless transceiver module comprises: a RFID (Radio Frequency Identification) tag 504 recording the identity of the user of the transporter and the related information and a user side wireless signal module 520 used to transmit and receive signals. In a campus environment 524, RFID information transmission systems are installed in the places wherein a disabled person may need help, such as a staircase. Thus, at least one RFID receiver 502 and at least one terminal side wireless signal module 522 are equipped in each staircase. When a barrier-overpassing transporter of the present invention intends to go upstairs, the RFID receiver 502 receives a signal from the RFID tag 504. Then, the information about the operational safety of the barrier-overpassing transporter, such as the position and speed of the barrier-overpassing transporter, the staircase slope, the status of the rider, etc., is sent to a control center 600. The control center 600 processes the information and feedback the processed information to the user side wireless signal module 520 via the terminal side wireless signal module 522. The information received by the user side wireless signal module 520 includes the length, width and height of the staircase which the rider intends to climb. According to the information, whether the transporter can climb the staircase is determined. If the result is positive, the first and second clusters are controlled to synchronously or non-synchronously rotate so that the transporter can climb the staircase at the highest efficiency. Further, the operational states of the components of the transporter are also feedbacked to the control center 600 so that the control center 600 can learn whether the rider needs a special aid or whether the transporter malfunctions. Besides, the transporter and the control center 600 can feedback information to each other to update information so that the rider can have higher safety and more convenience.

Those embodiments described above are to exemplify the present invention to enable the persons skilled in the art to understand, make and use the present invention. However, it is not intended to limit the scope of the present invention. Any equivalent modification or variation according to the spirit of the present invention is to be also included within the scope of the claims stated below.

What is claimed is:

1. A barrier-overpassing transporter comprising:

a support frame supporting an effective load;

a sensing/adjusting module coupled to said support frame, detecting a tilting state of said support frame and maintaining said support frame in a horizontal state;

a ground contact module arranged below said support frame supporting said effective load and lifting said support frame to overpass a surface of a barrier; and a wireless transceiver module arranged on said support frame, collecting and transmitting information to enable adjustments and activities responding to interior states of said transporter, said wireless transceiver module further including a radio-frequency identification tag attached to said barrier-overpassing transporter and recording identity of a user and related information; and a user side wireless signal module installed in said barrier-overpassing transporter and used to receive and transmit information.

2. A barrier-overpassing transporter according to claim 1, wherein said sensing/adjusting module further comprises:

a sensing device coupled to said support frame and used to detect a tilting state of said support frame; and a balance mechanism device joined to said support frame and maintaining said support frame in a horizontal state according to signals output by said sensing device.

3. A barrier-overpassing transporter according to claim 2 further comprising a deformable protection housing covering said balance mechanism device.

4. A barrier-overpassing transporter according to claim 2, wherein said sensing device is a multi-directional tilt-sensing device.

5. A barrier-overpassing transporter according to claim 1, wherein said ground contact module further comprises:

at least one rotation arm coupled to a base and used to rotate said ground contact module;

at least one ground contact element pivotally coupled to ends of said rotation arm and driven by said rotation arm to rotate with respect to center of said rotation arm to enable said transporter to overpass a barrier; and a driving device installed in said ground contact module and generating a current, wherein said current is amplified by a servo amplifier to drive a wheel servo motor and a cluster servo motor.

6. A barrier-overpassing transporter according to claim 5, wherein at least four contact points of said ground contact elements contact a ground.

7. A barrier-overpassing transporter according to claim 5, wherein said ground contact elements are manually or automatically controlled.

8. A barrier-overpassing transporter according to claim 5, wherein said ground contact elements include at least one pair of wheels driven by said rotation arm to rotate with respect to center of said rotation arm.

9. A barrier-overpassing transporter according to claim 1, wherein said support frame can rotate.

10. A barrier-overpassing transporter according to claim 1, wherein height of said support frame with respect to a ground can be changed by rotation of said ground contact elements driven by said rotation arms, activities of another mechanism, or another mechanical skill.

11. A barrier-overpassing transporter according to claim 1, wherein when said barrier-overpassing transporter moves uphill, said support frame is maintained in a horizontal state, and body's gravity center is moved toward a same direction as said transporter advances.

12. A barrier-overpassing transporter according to claim 1, wherein when said barrier-overpassing transporter moves downhill, said support frame is maintained in a horizontal state, and body's gravity center is moved toward a direction opposite to an advance direction of said transporter.

13. A barrier-overpassing transporter according to claim 1, wherein said user side wireless signal module receives signals from environment and interior of said barrier-overpassing transporter and then sends out said signals.

14. A barrier-overpassing transporter according to claim 1, wherein said signals said user side wireless signal module receives from environment and interior of said barrier-overpassing transporter include: a ratio of length to width of a staircase, a staircase slope, rider information, and safe-operation information of said barrier-overpassing transporter.

* * * * *